United States Patent
Kuhn et al.

(10) Patent No.: US 8,415,430 B2
(45) Date of Patent: Apr. 9, 2013

(54) THERMOPLASTIC ELASTOMERS

(75) Inventors: Dieter Kuhn, Rodenbach (DE); Werner Michel, Luetzelbach (DE); Mario Scholz, Gruendau (DE); Uwe Schachtely, Kahl am Main (DE); Thomas Welker, Hanau (DE); Andrea Tietze, Frankfurt (DE); Ulrich Boes, Frankfurt a. M. (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 12/936,467

(22) PCT Filed: Mar. 24, 2009

(86) PCT No.: PCT/EP2009/053404
§ 371 (c)(1),
(2), (4) Date: Oct. 5, 2010

(87) PCT Pub. No.: WO2009/141185
PCT Pub. Date: Nov. 26, 2009

(65) Prior Publication Data
US 2011/0034590 A1 Feb. 10, 2011

(30) Foreign Application Priority Data
May 19, 2008 (EP) .................... 08156435

(51) Int. Cl.
*C08L 53/02* (2006.01)
(52) U.S. Cl.
USPC ......... 525/88; 525/92 B; 525/92 C; 525/92 F; 525/92 R; 525/95; 525/96; 525/191; 525/240; 525/241; 428/403; 428/405
(58) Field of Classification Search .................... None
See application file for complete search history.

(56) References Cited

U.S. PATENT DOCUMENTS

| 5,741,843 | A | * | 4/1998 | Koblitz et al. | 524/505 |
| 6,649,704 | B2 | * | 11/2003 | Brewer et al. | 525/431 |
| 6,749,580 | B2 | * | 6/2004 | Work et al. | 604/29 |
| 7,923,504 | B2 | * | 4/2011 | Schachtely et al. | 524/493 |
| 2007/0129480 | A1 | * | 6/2007 | Nowak et al. | 524/493 |
| 2007/0155905 | A1 | * | 7/2007 | Drewniak et al. | 525/240 |
| 2010/0092710 | A1 | | 4/2010 | Welker et al. | |
| 2011/0112219 | A1 | | 5/2011 | Schachtely et al. | |

FOREIGN PATENT DOCUMENTS

| EP | 0 637 616 | | 2/1995 |
| EP | 637 616 A1 | * | 2/1995 |
| EP | 1 655 331 | | 5/2006 |
| WO | WO 2007/000382 | * | 1/2007 |

OTHER PUBLICATIONS

International Search Report issued May 19, 2009 in PCT/EP09/53404 filed Mar. 24, 2009.
Chatterjee, K. et al. "Study on Characterization and Properties of Nanosilica-Filled Thermoplastic Vulcanizates", Polymer Engineering and Science, vol. 48, No. 6, pp. 1077-1084, XP002493256, (Apr. 22, 2008).
Oscar, F. Olea Mejia et al. "Thermoplastic polyurethane elastomer reinforced with fumed silica nanoparticles: effects on thermal, mechanical and tribological properties", Journal of E-MRS Fall Meeting, 1 page, XP002493257, (2006).
U.S. Appl. No. 13/577,709, filed Aug. 8, 2012, Welker, et al.

* cited by examiner

*Primary Examiner* — Marc Zimmer
(74) *Attorney, Agent, or Firm* — Oblon, Spivak, McClelland, Maier & Neustadt, L.L.P.

(57) ABSTRACT

Thermoplastic elastomer, which comprises a fumed, hydrophilic or hydrophobic silica, which has been structurally modified and also a process for the improvement of the mechanical properties of thermoplastic elastomers. The thermoplastic elastomers are produced by preparing a masterbatch from the components (e.g. thermoplastic resin component and fumed silica) and compounding this with further thermoplastic elastomers.

11 Claims, No Drawings

THERMOPLASTIC ELASTOMERS

CROSS REFERENCE TO RELATED APPLICATION

This application is a 371 of PCT/EP09/053404, filed on Mar. 24, 2009, and claims priority to European Patent Application No. 08 156 435.3, filed on May 19, 2008.

The invention relates to thermoplastic elastomers.

Thermoplastic elastomers (abbreviated to TPE) are plastics whose behaviour at room temperature is similar to that of traditional elastomers but when heated can undergo plastic deformation, therefore exhibiting thermoplastic behaviour.

Elastomers are usually three-dimensional-network molecules chemically crosslinked into a wide-mesh structure. The crosslinking cannot be reversed without destroying the material.

Some of the crosslinking points in thermoplastic elastomers are physical (secondary-valence forces or crystallites), and these separate on heating, without destroying the macromolecules. These materials therefore have substantially better processability than normal elastomers. By way of example, it is even possible to re-melt and re-process waste materials from these plastics.

Thermoplastic elastomers are increasingly used in traditional rubber applications, because cycle times for processing are very short, since the process is similar to that for plastics.

Other application sectors for thermoplastic elastomers are retention systems for passengers in vehicles, examples being covers for airbags, movable cable sleeves, etc.

Particular application sectors can use a thermoplastic elastomer composed for example of SEEPS (styrene-ethylene-ethylene/propylene-styrene) and PP (poly-propylene).

Thermoplastic elastomers of this type can have the disadvantage that although their transverse mechanical properties (i.e. perpendicular to the direction of flow) do not alter or alter only slightly, their longitudinal mechanical properties (i.e. along the direction of flow) are relatively poor. This relationship can also be reversed, depending on the formulation of the thermoplastic elastomer.

It was therefore an object to produce thermoplastic elastomers which have isotropic mechanical properties. Their longitudinal and transverse mechanical properties are intended to be identical or almost identical.

The invention provides a thermoplastic elastomer characterized in that it comprises a hydrophobic or hydrophilic fumed silica which has been structurally modified.

The hydrophobic fumed silica can have been hydrophobized by means of a surface-modifying agent or by means of a silane.

A compound from the following list can be used as surface-modifying agent or as silane:

a) organosilanes of the type $(RO)_3Si\,(C_nH_{2n+1})$ and $(RO)_3Si\,(C_nH_{2n-1})$
   R=alkyl, e.g. methyl, ethyl, n-propyl, iso-propyl, butyl
   n=from 1 to 20 b) organosilanes of the type $R'_x(RO)_ySi(C_nH_{2n+1})$ and $R'_x(RO)_ySi(C_nH_{2n-1})$
   R=alkyl, e.g. methyl, ethyl, n-propyl, iso-propyl, butyl
   R'=alkyl, e.g. methyl, ethyl, n-propyl, iso-propyl, butyl
   R'=cycloalkyl
   n=from 1 to 20
   x+y=3
   x=1, 2
   y=1, 2 c) haloorganosilanes of the type $X_3Si(C_nH_{2n+1})$ and $X_3Si\,(C_nH_{2n-1})$
   X=Cl, Br
   n=from 1 to 20 d) haloorganosilanes of the type $X_2(R')Si\,(C_nH_{2n+1})$ and $X_2(R')Si\,(C_nH_{2n-1})$
   X=Cl, Br
   R'=alkyl, e.g. methyl, ethyl, n-propyl, iso-propyl, butyl
   R'=cycloalkyl
   n=from 1 to 20 e) haloorganosilanes of the type $X(R')_2Si\,(C_nH_{2n+1})$ and $X(R')_2Si\,(C_nH_{2n-1})$
   X=Cl, Br
   R'=alkyl, e.g. methyl, ethyl, n-propyl, iso-propyl, butyl
   R'=cycloalkyl
   n=from 1 to 20 f) organosilanes of the type $(RO)_3Si\,(CH_2)_m$—R'
   R=alkyl, e.g. methyl, ethyl, propyl
   m=0, from 1 to 20
   R'=methyl, aryl (e.g. —$C_6H_5$, substituted phenyl radicals)
   —$C_4F_9$, —$OCF_2$—CHF—$CF_3$, —$C_6F_{13}$, —O—$CF_2$—$CHF_2$
   —$NH_2$, —$N_3$, —SCN, —CH=$CH_2$, —NH—$CH_2$—$CH_2$—$NH_2$,
   —N—$(CH_2$—$CH_2$—$NH_2)_2$
   —OOC($CH_3$) C=$CH_2$
   —$OCH_2$—CH(O)$CH_2$
   —NH—CO—N—CO—$(CH_2)_5$
   —NH—COO—$CH_3$, —NH—COO—$CH_2$—$CH_3$,
   —NH—$(CH_2)_3$Si $(OR)_3$
   —$S_x$—$(CH_2)_3$Si $(OR)_3$
   —SH
   —NR'R"R''' (R'=alkyl, aryl; R"=H, alkyl, aryl; R'''=H, alkyl, aryl, benzyl, $C_2H_4$NR""R"''', where R""=H, alkyl and R"'''=H, alkyl)

g) organosilanes of the type $(R")_x\,(RO)_ySi\,(CH_2)_m$—R"

$$R'' = \text{alkyl}$$
$$= \text{cycloalkyl}$$
$$x + y = 2$$
$$x = 1, 2$$
$$y = 1, 2$$
$$m = 0, \text{from 1 to 20}$$

R'=methyl, aryl (e.g. —$C_6H_5$, substituted phenyl radicals)
—$C_4F_9$, —$OCF_2$—CHF—$CF_3$, —$C_6F_{13}$, —O—$CF_2$—$CHF_2$,
—$NH_2$, —$N_3$, —SCN, —CH=$CH_2$, —NH—$CH_2$—$CH_2$—$NH_2$,
—N—$(CH_2$—$CH_2$—$NH_2)_2$
—OOC($CH_3$)C=$CH_2$
—$OCH_2$—CH(O)$CH_2$
—NH—CO—N—CO—$(CH_2)_5$
—NH—COO—$CH_3$, —NH—COO—$CH_2CH_3$,
—NH—$(CH_2)_3$Si $(OR)_3$
—$S_x$—$(CH_2)_3$Si $(OR)_3$
—SH
—NR'R"R'''(R'=alkyl, aryl; R"=H, alkyl, aryl; R'''=H, alkyl, aryl, benzyl, $C_2H_4$NR""R"''', where R""=H, alkyl and R"'''=H, alkyl)

h) haloorganosilanes of the type $X_3Si\,(CH_2)_m$—R'
   X=Cl, Br
   m=0, from 1 to 20
   R'=methyl, aryl (e.g. —$C_6H_5$, substituted phenyl radicals)

—C$_4$F$_9$, —OCF$_2$—CHF—CF$_3$, —C$_6$F$_{13}$, —O—CF$_2$—CHF$_2$
—NH$_2$, —N$_3$, —SCN, —CH=CH$_2$, —NH—CH$_2$—CH$_2$—NH$_2$
—N—(CH$_2$—CH$_2$—NH$_2$)$_2$
—OOC(CH$_3$)C=CH$_2$
—OCH$_2$—CH(O)CH$_2$
—NH—CO—N—CO—(CH$_2$)$_5$
—NH—COO—CH$_3$, —NH—COO—CH$_2$—CH$_3$,
—NH—(CH$_2$)$_3$Si(OR)$_3$
—S$_x$—(CH$_2$)$_3$Si(OR)$_3$
—SH i) haloorganosilanes of the type (R)X$_2$Si (CH$_2$)$_m$—R'
X=Cl, Br
R=alkyl, e.g. methyl, ethyl, propyl
m=0, from 1 to 20
R'=methyl, aryl (e.g. —C$_6$H$_5$, substituted phenyl radicals)
—C$_4$F$_9$, —OCF$_2$—CHF—CF$_3$, —C$_6$F$_{13}$, —OCF$_2$—CHF$_2$
—NH$_2$, —N$_3$, —SCN, —CH=CH$_2$, —NH—CH$_2$—CH$_2$—NH$_2$,
—N—(CH$_2$—CH$_2$—NH$_2$)$_2$
—OOC(CH$_3$)C=CH$_2$
—OCH$_2$—CH(O)CH$_2$
—NH—CO—N—CO—(CH$_2$)$_5$
—NH—COO—CH$_3$, —NH—COO—CH$_2$—CH$_3$,
—NH—(CH$_2$)$_3$Si(OR)$_3$, where R can be methyl, ethyl, propyl, butyl
—S$_x$—(CH$_2$)$_3$Si(OR)$_3$, where R can be methyl, ethyl, propyl, butyl,
—SH j) haloorganosilanes of the type (R)$_2$XSi(CH$_2$)$_m$—R'
X=Cl, Br
R=alkyl
m=0, from 1 to 20
R'=methyl, aryl (e.g. —C$_6$H$_5$, substituted phenyl radicals)
—C$_4$F$_9$, —OCF$_2$—CHF—CF$_3$, —C$_6$F$_{13}$, —O—CF$_2$—CHF$_2$
—NH$_2$, —N$_3$, —SCN, —CH=CH$_2$, —NH—CH$_2$—CH$_2$—NH$_2$,
—N— (CH$_2$—CH$_2$—NH$_2$)$_2$
OOC(CH$_3$)C=CH$_2$
—OCH$_2$—CH(O)CH$_2$
—NH—CO—N—CO— (CH$_2$)$_5$
—NH—COO—CH$_3$, —NH—COO—CH$_2$—CH$_3$,
—NH—(CH$_2$)$_3$Si(OR)$_3$
—S$_x$—(CH$_2$)$_3$Si(OR)$_3$
—SH k) silazanes of the type

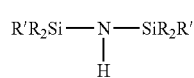

R=alkyl, vinyl, aryl
R'=alkyl, vinyl, aryl l) cyclic polysiloxanes of the type D 3, D 4, D 5, where D 3, D 4 and D 5 are cyclic polysiloxanes having 3, 4 or 5 units of the type —O—Si(CH$_3$)$_2$—. For example, octamethylcyclotetrasiloxane=D 4

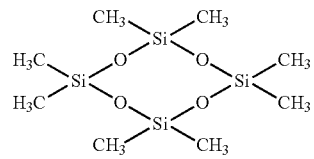

m) polysiloxanes or silicone oils of the type

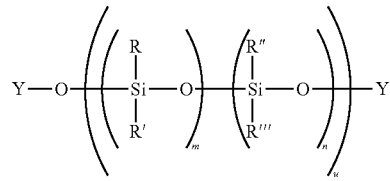

m=0, 1, 2, 3, . . . ∞
n=0, 1, 2, 3, . . . ∞
u=0, 1, 2, 3, . . . ∞
Y=CH$_3$, H, C$_n$H$_{2n+1}$ n=1-20
Y=Si (CH$_3$)$_3$, Si(CH$_3$)$_2$H Si(CH$_3$)$_2$OH, Si(CH$_3$)$_2$(OCH$_3$) Si(CH$_3$)$_2$ (C$_n$H$_{2n+1}$) n=1-20
R=alkyl, e.g. C$_n$H$_{2n+1}$, where n=from 1 to 20, aryl, e.g. phenyl and substituted phenyl radicals, (CH$_2$)$_n$—NH$_2$, H
R'=alkyl, e.g. C$_n$H$_{2n+1}$, where n=from 1 to 20, aryl, e.g. phenyl and substituted phenyl radicals, (CH$_2$)$_n$—NH$_2$, H
R''=alkyl, e.g. C$_n$H$_{2n+1}$, where n=from 1 to 20, aryl, e.g. phenyl and substituted phenyl radicals, (CH$_2$)$_n$—NH$_2$, H
R'''=alkyl, e.g. C$_n$H$_{2n+1}$, where n=from 1 to 20, aryl, e.g. phenyl and substituted phenyl radicals, (CH$_2$)$_n$—NH$_2$, H.

The invention also provides a thermoplastic elastomer characterized in that it comprises, as filler, a fumed silica which has been hydrophobized by dimethyldichlorosilane and structurally modified.

Fumed silicas which have been hydrophobized by dimethyldichlorosilane and have been structurally modified are known from U.S. Pat. No. 6,193,795.

A ball mill or a continuously operating ball mill can be used for the structural modification process.

During the structural modification process, the agglomerate structure of the fumed silica is mostly destroyed.

After the structural modification process, the DBP number is lower, or impossible to determine.

The inventive thermoplastic elastomer can moreover comprise an oil component and also components such as stabilizers.

Block copolymers and elastomer alloys are distinguished on the basis of internal structure.

Block copolymers have hard and soft segments within one molecule. The plastic is therefore composed of one type of molecule, comprising areas corresponding to the two properties (examples being SBS, SIS).

Elastomer alloys are polymer blends, i.e. mixtures of finished polymers, and the plastic is therefore composed of more than one type of molecule. Tailored materials are obtained through differing mixing ratios and additives (an example being polyolefin elastomer composed of polypropylene (PP) and natural rubber (NR). These materials cover a wide range of hardness, depending on the ratio of quantities).

Within thermoplastic elastomers a distinction is made between the following groups:

TPE-O or TPO=thermoplastic elastomers based on olefin, mainly PP/EPDM, e.g. Santoprene (AES/Monsanto). A thermoplastic elastomer referred to as a simple blend (physical blend) which can be obtained by uniformly mixing an elastomeric component with a thermoplastic resin.

TPE-V or TPV=crosslinked thermoplastic elastomers based on olefin, mainly PP/EPDM, e.g. Sarlink (DSM). A TPV is also a thermoplastic elastomer referred to as a simple blend (physical blend) which can be obtained by uniformly mixing an elastomeric component with a thermoplastic resin like a TPO. When the elastomeric component is also crosslinked during mixing, a thermoplastic elastomer known in the art as thermoplastic vulcanizate (TPV) results. Typically, a TPV is formed by a process known as dynamic vulcanization, wherein the elastomer and the thermoplastic matrix are mixed and the elastomer is cured with the aid of a crosslinking agent and/or catalyst during the mixing process. Since the crosslinked elastomeric phase of a TPV is insoluble and non-flowable at elevated temperature, TPVs generally exhibit improved oil and solvent resistance as well as reduced compression set relative to the simple blends.

The term "thermoplastic vulcanizate composition" (also referred to as simply thermoplastic vulcanizate or TPV) is broadly defined as any material that includes a dispersed, at least partially vulcanized, rubber component; a thermoplastic resin component; and an additive oil. A TPV material can further include other ingredients, other additives, or both. The term "vulcanized" is defined herein in its broadest sense, as reflected in any issued patent, printed publication, or dictionary, and refers in general to the state of a composition after all or a portion of the composition (e.g., crosslinkable rubber) has been subjected to some degree or amount of vulcanization is "dynamic vulcanization", discussed below, which also produces a "vulcanizate". Also, in at least one specific embodiment, the term vulcanized refers to more than insubstantial vulcanization, e.g., curing (crosslinking) that results in a measurable change in pertinent properties, e.g., a change in the melt flow index (MFI) of the composition by 10% or more (according to any ASTM-1238 procedure). In at least that context, the term vulcanization encompasses any form of curing (crosslinking), both thermal and chemical that can be utilized in dynamic vulcanization.

The term "dynamic vulcanization" means vulcanization or curing of a curable rubber blended with a thermoplastic resin under conditions of shear at temperatures sufficient to plasticize the mixture. In at least one embodiment, the rubber is simultaneously crosslinked and dispersed as micro-sized particles within the thermoplastic resin component. Depending on the degree of cure, the rubber and thermoplastic resin component ratio, compatibility of the rubber and thermoplastic resin component, the kneader type and the intensity of mixing (shear rate), other morphologies, such as co-continuous rubber phases in the plastic matrix, are possible.

The "rubber component" can be any material that is considered by persons skilled in the art to be a "rubber", preferably crosslinkable rubber (e.g., prior to vulcanization) or crosslinked rubber (e.g., after vulcanization). For example, the rubber component can be any olefin-containing rubber such as ethylene-propylene copolymers (EPM), including particularly saturated compounds that can be vulcanized using free radical generators such as organic peroxides, as noted in U.S. Pat. No. 5,177,147. Other rubber components can include ethylene-propylene-diene (EPDM) rubber, or EPDM-type rubber, for example. An EPDM-type rubber can terpolymer derived from the polymerization of at least two different monoolefin monomers having from 2 to 10 carbon atoms, preferably 2 to 4 carbon atoms, and at least one polyunsaturated olefin having from 5 to 20 carbon atoms.

A list of preferred rubber components include, but are not limited to, ethylene-propylene-diene rubber, natural rubber, butyl rubber, halobutyl rubber, halogenated rubber copolymer of -alkylstyrene and at least one isomonoolefin having 4 to 7 carbon atoms, a copolymer of isobutylene and divinylbenzene, a rubber homopolymer of a conjugated diene having from 4 to 8 carbon atoms and a vinyl aromatic monomer having from 8 to 12 carbon atoms, or acrylonitrile monomer, or an alkyl substituted acrylonitrile monomer having from 3 to 8 carbon atoms, or an unsaturated carboxylic acid monomer, or an unsaturated anhydride of a dicarboxylic acid, or combinations thereof.

The polyolefinic thermoplastic resin can be any material that is not a "rubber" and that is a polymer or polymer blend considered by persons skilled in the art as being thermoplastic in nature, e.g., a polymer that softens when exposed to heat and returns to its original condition when cooled to room temperature. The polyolefinic thermoplastic resin component can contain one or more polyolefins, including polyolefin homopolymers and polyolefin copolymers. Except as stated otherwise, the term "copolymer" means a polymer derived from two or more monomers (including terpolymers, tetrapolymers, etc.), and the term "polymer" refers to any carbon-containing compound having repeat units from one or more different monomers.

Illustrative polyolefins can be prepared from mono-olefin monomers including, but are not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Preferably, the polyolefinic thermoplastic resin component is unvulcanized or non-crosslinked.

TPE-U or TPU=thermoplastic elastomers based on urethane, e.g. Desmopan (Bayer)
TPE-E or TPC=thermoplastic copolyester, e.g. Hytrel (DuPont)
TPE-S or TPS=styrene block copolymers (SBS, SEBS, SEPS, SEEPS and MBS), e.g. Septon (Kuraray)
TPE-A or TPA=thermoplastic copolyamides, e.g. PEBA
Elastomers that can be used for TPE-S or for TPO/TPV are:
SEPS, SEEPS styrene-ethylene-propylene-styrene
SEBS styrene-ethylene-butylene-styrene
SIS styrene-isoprene-styrene
SBS styrene-butadiene-styrene
EPDM ethylene-propylene-diene rubber
EPM ethylene-propylene rubber
IIR isoprene-isobutylene rubber
EVA ethyl-vinyl acetate
NR natural rubber
Mixtures of the abovementioned rubbers can also be used.
Thermoplastics that can be used for TPE-S or for TPO/TPV are:
Most particularly preferred among these thermoplastic polymers are polyolefins, such as polypropylene, polyurethanes, polyethylene, high-density polyethylene, low-density polyethylene, polyamides, such as nylon-6 and nylon-6,6, PVC, PET and blends and copolymers based on these polymers.
ABS acrylonitrile-butadiene-styrene
ASA acrylonitrile-styrene-acrylate
EP ethylene-propylene
ETFE ethylene-tetrafluoroethylene
EVAC ethylene-vinyl acetate
EVOH ethylene-vinyl alcohol
FEP tetrafluoroethylene-hexafluoropropylene ionomer MABS methylmethacrylate-acrylonitrile-butadiene-styrene
MBS methacrylate-butadiene-styrene
PA polyamide
PA 6 polyamide 6
PA 11 polyamide 11
PA 12 polyamide 12
PA 66 polyamide 66
PA 610 polyamide 610
PA 612 polyamide 612 high temperature resistant polyamides
PB polybutene
PBT polybutene terephthalate
PC polycarbonate
PCTFE polychlorotrifluoroethylene
PE polyethylene
HDPE high density polyethylene
HMW-HDPE high molecular weight high density polyethylene
UHMW-HDPE ultra high molecular weight high density polyethylene
LDPE low density polyethylene
LLDPE linear low density polyethylene
VLDPE very low density polyethylene
MDPE medium density polyethylene
PE-C chlorinated polyethylene
PET polyethylene terephthalate
PFA perfluoro alkoxyl alkane
PIB polyisobutylene
PMMA polymethyl methacrylate
PMMI poly-N-methyl-methacrylamide
POM polyoxymethylene
PP polypropylene
PP-B polypropylene impact copolymers
PP-H polypropylene homopolymers
PP-R polypropylene random copolymers
PPE polyphenylene ether
PS polystyrene
EPS expandable polystyrene
HIPS high impact polystyrene
PTFE polytetrafluoroethylene
PVAC polyvinyl acetate
PVAL polyvinyl alcohol
PVC polyvinyl chloride
PVC-C chlorinated polyvinyl chloride
PVDC polyvinylidene chloride
PVDF polyvinylidene fluoride
SAN styrene-acrylonitrile
SB styrenebutadiene
SMAH styrene-maleic anhydride tetrafluoro-ethylene-hexafluoropropylene-vinylidene fluoride
VC copolymers of vinyl chloride biodegradable plastics The inventive thermoplastic elastomer TPE can comprise, alongside the filler, by way of example, an oil component, a polyolefinic thermoplastic resin component and a styrene block copolymer.

Styrene Block Copolymers: The SBC thermoplastics and thermoplastic elastomers useful in the invention can be block copolymers of styrene/conjugated diene/styrene, with the conjugated diene optionally being fully or partially hydrogenated, or mixtures thereof. Generally this block copolymer may contain 10 to 50 weight %, more preferably 25 to 35 weight % of styrene and 90 to 50 weight %, more preferably 75 to 35 weight % of the conjugated diene, based on said block copolymer. Most preferred, however, is a block copolymer which contains 28 to 35 weight % of styrene and 68 to 72 weight % of the conjugated diene. The conjugated diene is selected from butadiene, isoprene or mixtures thereof. Block copolymers of the styrene/conjugated diene/styrene types can be SBS, SIS, SIBS, SEBS and SEPS and SEEPS block copolymers.

These block copolymers useful are known in the art, and are further described in Canadian Patent 2,193,264 and in International Patent Applications WO 96/20248, WO 96/23823, WO 98/12240 and WO 99/46330. They are generally prepared by butyl lithium initiated sequential anionic polymerization, but coupling of living S-B/S diblocks or bifunctional initiation are also known methods—see, in general, Thermoplastic Elastomers ($2^{nd}$ Ed.), Ch. 3, G. Holden, N. Legge et al. (Hanser Publishers, 1996)—see US 2006/0220272).

The oil component can be: paraffinic (white oils), naphthenic, or aromatic mixtures of the oils mentioned (characterized via proportion of paraffins, naphthenes, aromatics, viscosity). Viscosity range: low to high viscosity, e.g. from 1 to 1300 $mm^2/s$ at 40° C.

The polyolefinic thermoplastic component can be any material which is not a "rubber", and which is a polymer or polymer blend which is regarded by the person skilled in the art as being of thermoplastic type, for example a polymer which softens when it is exposed to heat, and which returns to its original state when it is cooled to room temperature. The polyolefinic thermoplastic component can comprise one or more polyolefins, inclusive of polyolefin homopolymers and polyolefin copolymers. Unless otherwise stated, the expression "copolymer" means a polymer derived from two or more monomers (inclusive of terpolymers, tetrapolymers, etc.), and the expression "polymer" refers to any carbon-containing compound which has repeat units of one monomer or of more than one different monomer.

Examples of polyolefins can be produced from monoolefin monomers including inter alia the following: monomers having from 2 to 7 carbon atoms, e.g. ethylene, propylene, 1-butene, isobutylene, 1-pentene, 1-hexene, 1-octene, 3-methyl-1-pentene, 4-methyl-1-pentene, 5-methyl-1-hexene, mixtures of the same and copolymers of the same with (meth) acrylates and/or with vinyl acetates. The polyolefinic thermoplastic resin component is preferably non-vulcanized or non-crosslinked.

In one or more embodiments, the polyolefinic thermoplastic component comprises polypropylene. The expression "polypropylene" as used herein means in the broad sense any polymer regarded by the person skilled in the art as a "polypropylene" (as presented in at least one patent or one publication), and includes homopolymers, impact-resistant polymers and random terpolymers of propylene. The polypropylene used in the compositions described herein preferably has a melting point higher than 110° C., and includes at least 90% by weight of propylene units and contains isotactic sequences of such units. The polypropylene can also include atactic sequences or syndiotactic sequences, or both. The polypropylene can also include substantially syndiotactic sequences, so that the melting point of the polypropylene is higher than 110° C. The polypropylene can derive either exclusively from propylene monomers (i.e. those having only propylene units) or mainly from propylene (more than 80% of propylene), where the remainder derives from olefins, in particular ethylene and/or $C_4$-$C_{10}$ α-olefins. As found herein, certain polypropylenes have a high MFI (e.g. from low values of 10, 15 or 20 g/10 min up to high values of from 25 to 30 g/10 min). Others have a relatively low MFI, e.g. "partial" polypropylenes whose MFI is less than 1.0. Those with high MFI can be preferred because of easy processing or easy compounding.

In one or more embodiments, the polyolefinic thermoplastic component is isotactic polypropylene or includes the same. The polyolefinic thermoplastic component comprises one or more crystalline propylene homopolymers or propylene copolymers whose melting point is above 105° C., as measured by DSC. Preferred propylene copolymers comprise, without being restricted to these materials, propylene homopolymers or propylene terpolymers, impact-resistant propylene copolymers, random polypropylene and mixtures of the same. Preferred comonomers have 2 carbon atoms or from 4 to 12 carbon atoms. The comonomer is preferably ethylene.

These polyolefinic thermoplastic components and processes for the production of the same are described in the U.S. Pat. No. 6,342,565.

The expression "random polypropylene" as used herein means in general terms a single-phase propylene copolymer with up to 9% by weight, preferably 2% by weight and 8% by weight, of an α-olefin comonomer. Preferred α-olefin comonomers have 2 carbon atoms or from 4 to 12 carbon atoms. The α-olefin comonomer is preferably ethylene.

The thermoplastic elastomer can contain the following fillers and reinforcements:
Carbon
Graphite
Carbon black
Spherical fillers
Solid spherical fillers
Solid glass spheres
Other mineral solid spherical fillers
Hollow spherical fillers
Hollow glass spheres
Other mineral hollow spherical fillers
Conductive fillers
Metal and metal oxides
Metallic fibres
Metal oxides
Metallic flakes
Mineral fillers
Aluminium trihydroxide
Barium sulphate
Calcium carbonate
Natural calcium carbonate
Precipitated calcium carbonate
Dolomite
Silica
Natural silica
Quartz
Synthetic silica
Cristabolite
Precipitated silica
Pyrogenic silica
Fused silica
Silicates
Natural silicates
Feldspar
Nepheline syenite
Mica
Kaolin
Calcined kaolin
Slate
Talc
Wollastonite
Synthetic silicates
Precipitated calcium silicate
Precipitated sodium aluminium silicate
Silicon carbide
Synthetic fibres
Aramid fibres
Glass fibres
Carbon fibres
Mineral fibres
Polyamide fibres
Polyester fibres The inventive thermoplastic elastomer can moreover comprise flame retardants, such as phosphates, phosphorus, ammonium polyphosphate, magnesium hydroxide, triphenyl phosphate, melamine cyanurate, expandable graphite, dipentaerythritol.

The thermoplastic matrix or compound can contain other additives like:
antifogging agents
antistatic agents
biocides
dispersants
compatibilizers
pigment dispersants
fragrances
air release agents
colorants
dyes
pigments
inorganic pigments
white pigments
carbon black
coloured inorganic pigments
organic pigments
special colorants
flame retardants
inorganic flame retardants
organic flame retardants
halogen-free flame retardants
halogenated flame retardants
brominated flame retardants
chlorinated flame retardants
lubricants and related auxiliaries
lubricants
antiblocking agents
antislip agents
slip agents
coupling agents
silanes
titanates
zirconates
initiators
organic peroxides
flatting agents
nucleating agents
nucleating agents for foams
optical brighteners
impact modifiers
stabilizers
antioxidants
light stabilizers
metal deactivators
PVC stabilizers
acid acceptors
chemical blowing agents
processing aids
processing aids (PVC)
processing aids (polyolefins)
antisetting agents
mould release agents
low profile additives thixotropic agents
viscosity regulators
crosslinking agents
plasticizers The inventive thermoplastic elastomer can comprise from 0.5 to 20% by weight, preferably from 4 to 14% by weight, of fumed, structurally modified silica.

The silica can be added in powder form.

In one variant of the inventive process, which can also be preferred, the fumed silica can first be used to produce a masterbatch with the thermoplastic component, preferably with the polypropylene component, which can then be blended with other formulation constituents of the thermoplastic elastomer of the SEEPS component.

The invention also provides a masterbatch composed of the thermoplastic component and of fumed silica.

Another preferred subject matter of the invention is a masterbatch composed of polypropylene and of fumed silica which has been hydrophobized by means of dimethyldichlorosilane, and which has been structurally modified.

The masterbatch can comprise an amount of up to 50%, preferably 40%, based on the total weight, of the fumed hydrophobized silica. However, it should comprise at least 20% by weight, preferably at least 32% by weight, of fumed, structurally modified silica.

The masterbatch can also comprise the oil components.

The invention also provides a process for the improvement of the mechanical properties of thermoplastic elastomers, which is characterized in that a fumed structurally modified silica is added to the thermoplastic elastomers.

In one embodiment of the invention, a hydrophilic fumed, structurally modified silica can be added.

In one embodiment of the invention, a hydrophobic fumed, structurally modified silica can be added.

In another embodiment, a fumed hydrophobic silica is used which has been hydrophobized by means of a surface-modifying agent or by means of a silane.

Another preferred subject matter of the invention is a process for the improvement of the mechanical properties of thermoplastic elastomers, which is characterized in that a fumed silica hydrophobized by means of dimethyldichlorosilane is added to the thermoplastic elastomers.

The fumed silica hydrophobized by means of dimethyldichlorosilane is known from DE 11 63 784. The fumed silica AEROSIL R972 can preferably be used.

In particular, the inventive process can improve the tear resistance along and across the direction of flow of the thermoplastic elastomer.

The invention also provides the use of a fumed silica for the improvement of the tear resistance of thermoplastic elastomers TPE.

In one embodiment of the invention, a hydrophilic fumed, structurally modified silica can be added.

In one embodiment of the invention, a hydrophobic fumed, structurally modified silica can be added.

In another embodiment of the invention, a hydrophobic fumed silica can be added which has been hydrophobized by means of a surface agent or by means of a silane.

Another preferred subject matter of the invention is the use of a fumed silica which has been hydrophobized by means of dimethyldichlorosilane, for the improvement of the tear resistance of thermoplastic elastomers TPE.

In particular, the fumed silica which has been hydrophobized by means of dimethyldichlorosilane can be used for the improvement of the tear resistance longitudinally and transversely with respect to the direction of flow of thermoplastic elastomers TPE.

The fumed silica which has been hydrophobized by means of dimethyldichlorosilane can also be used for the improvement of the elongation at break, in particular in the longitudinal direction.

The invention also provides the use of a fumed silica which has been hydrophobized by means of dimethyldichlorosilane and has then been structurally modified, for the improvement of the mechanical properties of thermoplastic elastomers.

The fumed silica which has been hydrophobized by means of dimethyldichlorosilane can have been structurally modified according to U.S. Pat. No. 6,193,795.

The fumed silica AEROSIL R9200 can preferably be used. It is known from WO 2004/020532. A silanized, structurally modified fumed silica which has groups fixed to the surface can equally be used, where these are dimethyl silyl and/or monomethyl silyl groups. They are known from DE 102 39 423 A1. The definition of the term "structurally modified" here is as stated above.

The inventive thermoplastic elastomers, and also the inventive masterbatches, can be produced in known apparatuses, for example in an extruder.

The inventive thermoplastic elastomers have isotropic mechanical properties.

The inventive thermoplastic elastomers have improved thermal and mechanical properties. In particular in the longitudinal direction, the inventive thermoplastic elastomers have improved tear resistance, and tensile strength, and also improved elongation at break. The material likewise has improved heat resistance.

The inventive thermoplastic elastomer has almost isotropic mechanical properties.

The inventive thermoplastic elastomer can be used in automobile interiors, to increase high-temperature lightfastness for automobile-interior applications, as sealing profile for glass-backing applications in automobile construction and in building, and also in automobile construction and electrical engineering for gaskets in the region of lamps, preference being given to applications involving dynamic stress.

The improved tear resistance permits use of the inventive thermoplastic elastomer for the production of babies' dummies.

EXAMPLES

Production of the Compounded Materials

The compounding process took place on a co-rotating, tightly intermeshing ZSE 27 Maxx twin-screw extruder from Leistritz.

The dry blends (composed of premix+thermoplastic) were produced in a high-speed mixer and introduced to the extruder through the main feed.

The premix is composed of 100 parts of SEEPS (styrene-ethylene-ethylene/propylene-styrene). A mixture composed of 100 parts of white oil and of 30 parts of polypropylene homopolymer (PPh) is added.

Four silicas were used as filler for the examples:

KS1: Fumed silica hydrophobized by dichlorodimethylsilane and based on a hydrophilic starting material whose surface area is 130 $m^2/g$ (AEROSIL R 972 V).

KS2: Fumed silica hydrophobized by dichlorodimethylsilane and based on a hydrophilic starting material whose surface area is 200 $m^2/g$. A structural modification process was also undertaken after the hydrophobization (AEROSIL R 9200).

KS3: Fumed hydrophilic silica whose surface area is 150 $m^2/g$ (AEROSIL 150).

KS4: Fumed silica hydrophobized by polydimethylsiloxane and based on a hydrophilic starting material whose surface area is 150 m$^2$/g (AEROSIL R 202 VV 90).

Tables 1 to 4 list the physico-chemical data for the fumed silica used.

TABLE 1

AEROSIL ® R 972 V
Compacted hydrophobic fumed silica
AEROSIL ® R 972 V is a compacted fumed silica which has been hydrophobized by DDS (dimethyldichlorosilane), and is based on hydrophilic fumed silica whose specific surface area is 130 m$^2$/g.
Physico-chemical data:

| Properties | Unit | Guideline values |
|---|---|---|
| Specific surface area (BET) | m$^2$/g | 110 ± 20 |
| C content | % by weight | 0.6-1.2 |
| Average size of primary particles | Nm | 16 |
| Compacted bulk density (approx. value)* by analogy with DIN ISO 787/11, August 1983 | g/l | about 90 |
| Loss on drying* 2 h at 105° C. | % by weight | ≦0.5 |
| Loss on ignition, 2 h at 1000° C., based on the dried substance (2 h at 105° C.) | % by weight | ≦2.0 |
| pH 4% strength dispersion | | 3.6-4.4 |
| SiO$_2$ content, based on the substance after ignition | % by weight | ≧99.8 |

*ex plant

TABLE 2

AEROSIL ® R 9200
Hydrophobic fumed silica
AEROSIL ® R 9200 is a structurally modified hydrophobic fumed silica.
Physico-chemical data:

| Properties | Unit | Guideline values |
|---|---|---|
| Specific surface area (BET) | m$^2$/g | 170 ± 20 |
| C content | % by weight | 0.7-1.3 |
| Compacted bulk density (approx. value)* by analogy with DIN EN ISO 787/11, August 1983 | g/l | about 200 |
| Loss on drying* 2 h at 105° C. | % by weight | ≦1.5 |
| pH 4% strength dispersion | | 3.0-5.0 |
| SiO$_2$ content, based on the substance after ignition | % by weight | ≧99.8 |
| Al$_2$O$_3$ content | % by weight | ≦0.10 |
| Fe$_2$O$_3$ content | % by weight | ≦0.01 |
| TiO$_2$ content | % by weight | ≦0.03 |
| HCl content | % by weight | ≦0.025 |

*ex plant

TABLE 3

AEROSIL ® 150
Hydrophilic fumed silica
AEROSIL ® 150 is a hydrophilic fumed silica whose specific surface area is 150 m$^2$/g.
Physico-chemical data:

| Properties | Unit | Guideline values |
|---|---|---|
| Specific surface area (BET) | m$^2$/g | 150 ± 15 |
| Average size of primary particles | Nm | 14 |
| Compacted bulk density (approx. value)* by analogy with DIN ISO 787/11, August 1983 | g/l | about 50 |
| Loss on drying* 2 h at 105° C. | % by weight | ≦0.5 |
| Loss on ignition, 2 h at 1000° C., based on the dried substance (2 h at 105° C.) | % by weight | ≦1.0 |
| pH 4% strength dispersion | | 3.7-4.7 |
| SiO$_2$ content, based on the substance after ignition | % by weight | ≧99.8 |

*ex plant

TABLE 4

AEROSIL ® R 202 VV 90
Compacted hydrophobic fumed silica
AEROSIL ® R 202 VV 90 is a compacted fumed silica which has been hydrophobized by polydimethylsiloxane and is based on hydrophilic fumed silica whose specific surface area is 150 m$^2$/g.
Physico-chemical data:

| Properties | Unit | Guideline values |
|---|---|---|
| Specific surface area (BET) | m$^2$/g | 100 ± 20 |
| C content | % by weight | 3.5-5.0 |
| Average size of primary particles | Nm | 14 |
| Compacted bulk density (approx. value)* by analogy with DIN ISO 787/11, August 1983 | g/l | about 90 |
| Loss on drying* 2 h at 105° C. | % by weight | ≦0.5 |
| Loss on ignition, 2 h at 1000° C., based on the dried substance (2 h at 105° C.) | % by weight | 4.0-6.0 |
| pH 4% strength dispersion | | 3.6-4.4 |
| SiO$_2$ content, based on the substance after ignition | % by weight | ≧99.8 |

*ex plant

The filler (fumed silica) can be added in two different ways:
1. It can be added directly in powder form. For this, a proportion of up to 4% of filler is added to the premixes. The further amounts of filler were conveyed through a separate feed gravimetrically into the melt, using an ancillary side feeding extruder.
2. The filler is added by means of a masterbatch, where the fumed silica has first been mixed with the polypropylene homopolymer.

The masterbatch/polypropylene homopolymer (PP-h) was added to the high-speed mixer after preparation of the premixes, thus producing a dry blend. The content of thermoplastic (polypropylene homopolymer) needed in the entire formulation must remain the same, and is partially replaced by the polypropylene homopolymer present in the masterbatch.

TABLE 5

| Extruder parameters: | |
|---|---|
| Extruder settings | |
| Rotation rate, rpm | 350 |
| Throughput, kg/h | 10-15 |
| Barrel temp., °C. | 180-200 |
| Specified values | |
| Melt temp., °C. | 170-190 |
| Melt pressure, bar | >20 |

Injection Moulding

All of the compounded materials were used to produce plaques whose dimensions were 150 mm×100 mm×2 mm, in conventional injection-moulding processes (for which the machine parameters can be found in Table 6.

TABLE 6

| Settings for 2 mm plaque | |
|---|---|
| Cylinder temperature, °C. | 180-200 |
| Peripheral velocity of screw, mm/sec | 140-150 |
| Back pressure, bar | 40-50 |
| Injection rate, % | 65-70 |
| Hold-pressure time, sec. | 5-25 |
| Hold pressure, bar | 280-500 |
| Mould temperature, °C. | 30-35 |
| Cooling time | 5-20 |

The following tests were carried out on the plaques of the compounded materials:

Shore A hardness test to DIN 53 505 determination of ultimate tensile strength, tensile strength, elongation at break and stress values in the tensile test, longitudinal/transverse, to DIN 53 504, S2 specimen longitudinal/transverse tear resistance, to DIN 53 515 (DIN 350 34-1), angled specimen heat-ageing*[1] to DIN 350 815

*[1]=test of mechanical properties after heat-ageing:

The test specimens were stamped out from the injection-moulded plaques. The film gate at the side of the plaque causes orientation of the flow of the melt. The orientation of the flow leads to anisotropic properties of the plaque. In order to discern the effect of hot-air ageing on anisotropy, the specimens were stamped out from the plaques respectively longitudinally and perpendicularly to the orientation of flow.

The specimens were aged at 150° C. in a convection oven. After 3 days, and also after 7 days, some of the specimens were removed from the oven and aged for 24 h under standard conditions (23° C., 50% rel. humidity). The tests were then carried out according to the abovementioned standards.

Example 1

A compounded TPE-S material was produced according to the instructions described above.

The loading level of fumed silica filler was varied from 1 to 8%, and the material here was added directly in powder form.

Mechanical properties (longitudinal and tranverse) were compared with the unfilled compounded TPE-S material.

TABLE 7

| | | LONGITUDINAL results: | | |
|---|---|---|---|---|
| | Hardness [Shore A] | Longitudinal tensile strength [MPa] | Longitudinal elongation at break [%] | Compression set (24 h 75° C.) [%] |
| Reference | 58 | 3.3 | 233 | 37 |
| 1% KS 1 | 56 | 3.3 | 265 | 36 |
| 2% KS 1 | 56 | 3.5 | 320 | 38 |
| 4% KS 1 | 62 | 4.7 | 435 | 37 |
| 8% KS 1 | 68 | 7.0 | 529 | 44 |

Surprisingly, it has been found that the use of the fumed silica KS 1 in TPE-S materials could raise the tensile strength and elongation at break (determined longitudinally) by 112%/127%, while advantageously the compression set could be held at the same level.

TABLE 8

| | | TRANSVERSE results: | | |
|---|---|---|---|---|
| | Hardness [Shore A] | Transverse tensile strength [MPa] | Transverse elongation at break [%] | Compression set (24 h 75° C.) [%] |
| Reference | 58 | 12.4 | 855 | 37 |
| 1% KS 1 | 56 | 12.0 | 845 | 36 |
| 2% KS 1 | 56 | 12.8 | 837 | 38 |
| 4% KS 1 | 62 | 15.3 | 847 | 37 |
| 8% KS 1 | 68 | 17.6 | 820 | 44 |

Tensile strength improved with increasing amount of fumed silica KS 1, while the use of the fumed silica KS 1 causes hardly any change in the elongation at break (determined transversely), when comparison is made with the reference.

The two elongation-at-break tables (longitudinal & transverse) show a novel and very important advantage of the inventive thermoplastic elastomer in relation to the use of fumed silica in TPE-S. By virtue of the marked increase in longitudinal elongation at break and the very small alteration in transverse values for elongation at break, the longitudinal & transverse values for elongation at break become closer as the amount used of fumed silica KS 1 increases. That means that the isotropy within the injection-moulded TPE-S part is markedly improved, and that the subsequent component produced from the inventive thermoplastic elastomer has higher dimensional stability.

Example 2

A compounded TPE-S material is produced according to the instructions described above.

The loading level of fumed silica filler is 12%. The fumed silica KS 1 was added directly in powder form. Mechanical properties (longitudinal and tranverse) were compared with the unfilled compounded TPE-S material.

TABLE 9

| | Longitudinal tear resistance [N/mm] | Transverse tear resistance [N/mm] |
|---|---|---|
| Reference | 19 | 16 |
| 12% KS 1 | 40 | 30 |

Surprisingly, it has been found that the use of 12% of fumed silica KS 1 can raise the longitudinal/transverse tear resistance in TPE-S by approximately ~111%/~88%.

Example 3

Specimens were stamped out from the injection-moulded TPE-S plaques produced in Example 1 with 8% filler content, and also the reference, and these were subjected to heat-ageing.
Mechanical properties (longitudinal and tranverse) were compared with the unfilled compounded TPE-S material.

TABLE 10

Longitudinal/transverse tensile strength results:

| | \multicolumn{5}{c}{Change in longitudinal tensile strength} |
| | 0 days | 3 days | | 7 days | |
| | MPa | MPa | Change % | MPa | Change % |
|---|---|---|---|---|---|
| Reference | 3.3 | 2.8 | −15.2 | 2.9 | −12.1 |
| 8% KS 1 | 7.0 | 9.8 | 40.0 | 10.2 | 45.7 |

Surprisingly, it has been found that the use of 8% of fumed silica KS 1 in the compounded TPE-S material can raise the tensile strength (determined longitudinally) after 7 days of heat-ageing at 150° C. by ~46%, when comparison is made with the initial value, while tensile strength of the reference falls by ~10% after 7 days of ageing.
The tensile strength values (determined transversely) remain at the same level despite heat-ageing.

TABLE 11

Longitudinal/transverse elongation at break results:

| | \multicolumn{5}{c}{Change in longitudinal elongation at break} |
| | 0 days | 3 days | | 7 days | |
| | % | % | Change % | % | Change % |
|---|---|---|---|---|---|
| Reference | 320 | 222 | −30.6 | 223 | −30.3 |
| 8% KS 1 | 529 | 740 | 39.9 | 759 | 43.5 |

Surprisingly, it has been found that the use of 8% of fumed silica KS 1 in the compounded TPE-S material can raise the elongation at break (determined longitudinally) after 7 days of heat-ageing at 150° C. by ~44%, when comparison is made with the initial value, while the tensile strength of the reference falls by ~30% after 7 days of ageing.
The elongation at break values (determined transversely) remain at the same level despite heat-ageing.
As described above in Example 1, the use of the fumed silica KS 1 markedly improves isotropy.
The heat-ageing additionally improves the elongation at break value (longitudinal) by ~44% for the TPE-S with 8% of filler, while the elongation at break measured transversely remains at the same level. This also gives an additional marked improvement in isotropy when comparison is made with non-aged TPE-S plaques.

Example 4

A compounded TPE-S material is produced according to the instructions described above.

The loading level of fumed silica filler KS 1 is 8%. The fumed silica KS 2 was added in the form of a polypropylene/fumed silica masterbatch. Mechanical properties (longitudinal and transverse) were compared with the unfilled compounded TPE-S material.

TABLE 12

LONGITUDINAL results:

| | Hardness [Shore A] | Longitudinal tensile strength [MPa] | Longitudinal elongation at break [%] | Compression set (24 h 75° C.) [%] |
|---|---|---|---|---|
| Reference | 58 | 3.3 | 233 | 37 |
| 8% KS 2 via masterbatch | 61 | 10.7 | 713 | 40 |

Surprisingly, it has been found that the use of the fumed silica KS 2 in the compounded TPE-S materials could raise the tensile strength and elongation at break (determined longitudinally) by 224%/206%, while the compression set and, unlike in Example 1, also the hardness, could advantageously be held at the same level.

TABLE 13

TRANSVERSE results:

| | Hardness [Shore A] | Transverse tensile strength [MPa] | Transverse elongation at break [%] | Compression set (24 h 75° C.) [%] |
|---|---|---|---|---|
| Reference | 58 | 12.4 | 870 | 37 |
| 8% KS 2 via masterbatch | 61 | 17.6 | 841 | 40 |

Tensile strength is improved with increasing amount of the fumed silica, while the use of the fumed silica produces only an insignificant change in the elongation at break (determined transversely) when comparison is made with the reference.
The important advantage of the use of the fumed silica in TPE-S resulting from the two tables with the results for elongation at break (longitudinal & transverse) is the same as previously shown in Example 1. The isotropy, and therefore the dimensional stability, of the subsequent component is markedly increased.
Surprisingly, it has been found that addition of the fumed silica KS 2 via masterbatch markedly increases the overall level of mechanical properties.
When the silica is added by means of masterbatch, the silica becomes distributed in the system in the elastomer phase, in the interface and in the thermoplastic. The result is that the silica acts to some extent as compatibilizer.

Example 5

Specimens were stamped out from the injection-moulded TPE-S plaques produced according to Example 4 with 8% filler content, and also the reference, and these were subjected to heat-ageing. Mechanical properties (longitudinal and transverse) were compared with the unfilled compounded TPE-S material.

TABLE 14

Results for longitudinal tensile strength:

| | \multicolumn{5}{c}{Change in longitudinal tensile strength} | | | | |
|---|---|---|---|---|---|
| | 0 days | 3 days | | 7 days | |
| | MPa | MPa | Change % | MPa | Change % |
| Reference | 3.3 | 2.8 | −15.2 | 2.9 | −12.1 |
| 8% KS 2 via masterbatch | 10.7 | 15.3 | 43.0 | 15.4 | 43.9 |

Surprisingly, it has been found that the use of 8% of the fumed silica KS 2 in the compounded TPE-S material could raise the tensile strength (determined longitudinally) after 7 days of heat-ageing at 150° C. by ~44%, when comparison is made with the initial value, while the tensile strength of the reference after 7 days of ageing fell by ~12%.

TABLE 15

Longitudinal/transverse elongation at break results:

| | \multicolumn{5}{c}{Change in longitudinal elongation at break} | | | | |
|---|---|---|---|---|---|
| | 0 days | 3 days | | 7 days | |
| | % | % | Change % | % | Change % |
| Reference | 320 | 222 | −30.6 | 223 | −30.3 |
| 8% KS 2 via masterbatch | 713 | 790 | 10.8 | 811 | 13.7 |

Surprisingly, it has been found that the use of 8% of the fumed silica KS 2 in the compounded TPE-S material could raise the elongation at break (determined longitudinally) after 7 days of heat-ageing at 150° C. by ~14%, when comparison is made with the initial value, while the tensile strength of the reference after 7 days of ageing fell by ~30%.

The values for elongation at break (determined transversely) remain at the same level, despite heat-ageing.

As previously described in Example 4, the use of the fumed silica KS 2 markedly improved isotropy. The heat-ageing additionally gave an improvement of ~14% in the (longitudinal) value for elongation at break of the TPE-S with 8% of filler, while the elongation at break measured transversely remained at the same level. This also markedly improved isotropy when comparison was made with un-aged TPE-S plaques. As likewise previously described in Example 4, mechanical properties were at a very high level by virtue of the fumed silica KS 2 and the addition via masterbatch. The result in Example 5 was almost complete elimination of the anisotropy of the TPE-S.

Example 6

A compounded TPE-S material is produced according to the instructions described above.

The loading level of fumed silica filler is 4%, added directly in powder form.

Mechanical properties (longitudinal and transverse) were compared with the unfilled compounded TPE-S material.

Longitudinal & Transverse Results:

| | Hardness [Shore A] | Longitudinal tensile strength [MPa] | Longitudinal elongation at break [%] | Compression set (24 h 75° C.) [%] |
|---|---|---|---|---|
| Reference | 58 | 3.3 | 233 | 37 |
| 4% KS 3 | 63 | 4.1 | 343 | 41 |

| | Hardness [Shore A] | Transverse tensile strength [MPa] | Transverse elongation at break [%] | Compression set (24 h 75° C.) [%] |
|---|---|---|---|---|
| Reference | 58 | 12.4 | 855 | 37 |
| 4% KS 3 | 63 | 16.0 | 853 | 41 |

Surprisingly, it has been found that the use of the fumed silica KS 3 in compounded TPE-S materials could raise tensile strength and elongation at break (determined longitudinally) by ~24%/~47%, while advantageously the compression set was altered only insignificantly. The possible improvement in transverse tensile strength was ~29%, whereas (transverse) elongation at break remains unaltered.

By virtue of the improvement in (longitudinal) elongation at break and the (transverse) elongation at break held at the same level, the longitudinal & transverse elongation-at-break properties become closer to one another, and this increases dimensional stability in the subsequent component.

Example 7

A compounded TPE-S material is produced according to the instructions described above.

The loading level of fumed silica filler was varied from 1 to 4%, and the material here was added directly in powder form.

Mechanical properties (longitudinal and tranverse) were compared with the unfilled compounded TPE-S material.

Longitudinal & Transverse Results:

| | Hardness [Shore A] | Longitudinal tensile strength [MPa] | Longitudinal elongation at break [%] | Compression set (24 h 75° C.) [%] |
|---|---|---|---|---|
| Reference | 58 | 3.3 | 233 | 37 |
| 1% KS 4 | 59 | 3.7 | 370 | 37 |
| 2% KS 4 | 58 | 4.0 | 442 | 37 |
| 4% KS 4 | 57 | 4.3 | 542 | 38 |

| | Hardness [Shore A] | transverse tensile strength [MPa] | Transverse elongation at break [%] | Compression set (24 h 75° C.) [%] |
|---|---|---|---|---|
| Reference | 58 | 12.4 | 855 | 37 |
| 1% KS 4 | 59 | 12.7 | 847 | 37 |
| 2% KS 4 | 58 | 14.1 | 850 | 37 |
| 4% KS 4 | 57 | 14.0 | 855 | 38 |

Surprisingly, it has been found that the use of the fumed silica KS 4 in compounded TPE-S materials could raise the tensile strength and elongation at break (determines longitudinally) by ~30%/~133%, while the compression set and the hardness of the compounded TPE-S materials advantageously remained unaltered. The possible improvement in transverse tensile strength was ~29%, whereas (transverse) elongation at break remains unaltered.

By virtue of the marked improvement in (longitudinal) elongation at break and the (transverse) elongation at break held at the same level, the longitudinal & transverse elongation-at-break properties become closer to one another, and this increases dimensional stability in the subsequent component.

The invention claimed is:

1. A thermoplastic elastomer, comprising a structurally modified hydrophilic or hydrophobic fumed silica, a styrene block copolymer, and a thermoplastic resin component, wherein the fumed silica has been hydrophobized by dimethyldichlorosilane.

2. The thermoplastic elastomer according to claim 1, comprising from 0.5 to 20% by weight of the structurally modified fumed silica.

3. The thermoplastic elastomer according to claim 1, further comprising an oil component.

4. A process for the production of the thermoplastic elastomer according to claim 1, comprising compounding a proportion of the fumed silica with a thermoplastic resin component to give a masterbatch, and compounding the masterbatch, comprising fumed silica and thermoplastic resin component, with an additional amount of the thermoplastic elastomer.

5. The process according to claim 4, wherein the masterbatch comprises from 20 to 50 wt.-%, based on a total weight, of fumed, structurally modified silica.

6. A process, comprising adding a hydrophilic or hydrophobic fumed silica, which has been structurally modified, to a styrene block copolymer and a thermoplastic resin component to obtain the thermoplastic elastomer according to claim 1, wherein the fumed silica is a fumed silicon dioxide, hydrophobized with dimethyldichlorosilane, and which has been structurally modified.

7. The thermoplastic elastomer according to claim 3, comprising from 0.5 to 20% by weight of the structurally modified fumed silica.

8. The thermoplastic elastomer according to claim 4, comprising from 0.5 to 20% by weight of the structurally modified fumed silica.

9. The thermoplastic elastomer according to claim 1, comprising from 4 to 14% by weight of the structurally modified fumed silica.

10. The thermoplastic elastomer according to claim 3, comprising from 4 to 14% by weight of the structurally modified fumed silica.

11. The thermoplastic elastomer according to claim 4, comprising from 4 to 14% by weight of the structurally modified fumed silica.

* * * * *